US010341070B2

(12) United States Patent
Yang et al.

(10) Patent No.: US 10,341,070 B2
(45) Date of Patent: Jul. 2, 2019

(54) METHOD AND APPARATUS OF DATA TRANSMISSION BY SETTING SEGMENTATION THRESHOLD BASED ON TRANSMISSION TIME INTERVAL

(71) Applicant: MEDIATEK INC., Hsinchu (TW)

(72) Inventors: Weidong Yang, San Diego, CA (US); Yih-Shen Chen, Zhubei (TW); Chien-Chang Li, Magong (TW); Bo-Si Chen, Keelung (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/672,523

(22) Filed: Aug. 9, 2017

(65) Prior Publication Data
US 2018/0048440 A1 Feb. 15, 2018

Related U.S. Application Data

(60) Provisional application No. 62/374,054, filed on Aug. 12, 2016.

(51) Int. Cl.
  *H04L 5/00* (2006.01)
  *G06F 17/11* (2006.01)
  *H04L 1/00* (2006.01)

(52) U.S. Cl.
  CPC ............ *H04L 5/0046* (2013.01); *G06F 17/11* (2013.01); *H04L 1/0005* (2013.01);
  (Continued)

(58) Field of Classification Search
  CPC ..... H04W 72/04; H04W 72/12; H04W 76/00; H04L 1/0011; H04L 1/0018; H04L 1/0007; H04L 5/0046
  (Continued)

(56) References Cited

U.S. PATENT DOCUMENTS 8,345,657 B2  1/2013 Yang et al.
2007/0177569 A1* 8/2007 Lundby ................. H04L 1/0017
                                          370/349
(Continued)

FOREIGN PATENT DOCUMENTS

CN        1756254 A      4/2006
WO    WO 2007/093879 A2  8/2007

OTHER PUBLICATIONS

International Search Report and Written Opinion dated Nov. 2. 2017 in PCT/CN2017/097004, citing documents AO, AP, AA, AB therein, 11 pages.

(Continued)

*Primary Examiner* — Temica M Beamer
(74) *Attorney, Agent, or Firm* — Oblon, McClelland, Maier & Neustadt, L.L.P.

(57) ABSTRACT

Aspects of the disclosure provide a method of data transmission that includes determining a transmission time interval for transmission of a transport block and setting a segmentation threshold for the transport block to a first threshold or a second threshold that is less than the first threshold based on the determined transmission time interval. The method includes converting the transport block into one or more outgoing code blocks that each has a size not greater than the determined segmentation threshold and encoding the one or more outgoing code blocks for transmission when communication device is configured to transmit the transport block. The method also includes receiving one or more incoming code blocks that each has a size not greater than the determined segmentation threshold and reconstructing the transport block from the one or more incoming code blocks when communication device is configured to receive the transport block.

17 Claims, 7 Drawing Sheets

(52) U.S. Cl.
CPC .......... *H04L 1/0007* (2013.01); *H04L 1/0011* (2013.01); *H04L 1/0018* (2013.01); *H04L 5/0094* (2013.01); *H04L 1/0061* (2013.01)

(58) Field of Classification Search
USPC .................. 455/450; 370/321, 329, 337, 341
See application file for complete search history.

(56) References Cited

U.S. PATENT DOCUMENTS

| | | |
|---|---|---|
| 2007/0248025 A1 | 10/2007 | Phan et al. |
| 2010/0008350 A1 | 1/2010 | Yang et al. |
| 2013/0242729 A1* | 9/2013 | Chen ................ H04W 28/0289 370/230 |
| 2016/0234812 A1* | 8/2016 | Kim ....................... H04L 1/004 |

OTHER PUBLICATIONS

Office Action dated Sep. 7, 2018 in corresponding Taiwanese Patent Application No. 106127266, (with English Translation of Category of Cited Documents), 6 pages.

* cited by examiner

METHOD AND APPARATUS OF DATA TRANSMISSION BY SETTING SEGMENTATION THRESHOLD BASED ON TRANSMISSION TIME INTERVAL

INCORPORATION BY REFERENCE

This present disclosure claims the benefit of U.S. Provisional Application No. 62/374,054, "Processing time reduction in 4G and 5G" filed on Aug. 12, 2016, which is incorporated herein by reference in its entirety.

TECHNICAL FIELD

The disclosed embodiments relate generally to wireless communication systems, and, more particularly, to a method and an apparatus of data transmission by setting a segmentation threshold based on a transmission time interval.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a communication system, data may be coded for transmission over a communication channel in order to reduce the errors caused by the communication channel. The data coding may be performed in the units of code blocks, where a size of each code block may range from a minimum code block size to a maximum code block size according to a predetermined communication standard. In some applications based on a Long-Term Evolution (LTE) standard, a batch of data, or also referred to as a transport block, may be fit into one code block when a size of the transport block plus a predetermined number of cyclic redundancy check (CRC) bits is not greater than a maximum code block size of 6144 bits. However, when a size of the transport block plus the predetermined number of CRC bits is greater than the maximum code block size, the transport block may be segmented into a plurality of code blocks. A segmentation threshold may be used to determine whether a transport block is to be segmented into multiple code blocks.

The encoded code blocks may be transmitted using physical recourses allocated based on a physical recourse unit defined by a predetermined number of sub-carriers, transmission time interval (TTI), and/or spatial multiplexing layers. In some applications based on the LTE standard, a physical recourse unit includes two resource blocks that in total correspond to 12 sub carriers and a TTI of 1 millisecond (ms) or 14 orthogonal frequency-division multiplexing (OFDM) symbols.

SUMMARY

Aspects of the disclosure provide a method of data transmission that includes determining a transmission time interval for transmission of a transport block and setting, by processing circuitry of a communication device, a segmentation threshold for the transport block to a first threshold or a second threshold that is less than the first threshold based on the determined transmission time interval for the transmission of the transport block. The method includes convening the transport block into one or more outgoing code blocks that each has a size not greater than the determined segmentation threshold and encoding the one or more outgoing code blocks for transmission when the communication device is configured to transmit the transport block. The method also includes receiving one or more incoming code blocks that each has a size not greater than the determined segmentation threshold and reconstructing the transport block from the one or more incoming code blocks when the communication device is configured to receive the transport block.

In one embodiment, the setting of the segmentation threshold includes setting the segmentation threshold to the first threshold when the determined transmission time interval is equal to or greater than a first transmission time interval, and setting the segmentation threshold to the second threshold when the determined transmission time interval is a second transmission time interval that is less than the first transmission time interval.

Aspects of the disclosure further provide a communication device for data transmission that includes a transceiver and processing circuitry coupled with the transceiver. The processing circuitry is configured to determine a transmission time interval for transmission of a transport block and set a segmentation threshold for the transport block to a first threshold or a second threshold that is less than the first threshold based on the determined transmission time interval for the transmission of the transport block. The processing circuitry is configured to convert the transport block into one or more outgoing code blocks that each has a size not greater than the determined segmentation threshold and encode the one or more outgoing code blocks for transmission through the transceiver when the communication device is configured to transmit the transport block. The processing circuitry is configured to receive through the transceiver one or more incoming code blocks that each has a size not greater than the determined segmentation threshold and reconstruct the transport block from the one or more incoming code blocks when the communication device is configured to receive the transport block.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

In accordance with the present disclosure, a segmentation threshold for processing a transport block may be determined based on a transmission time interval (TTI) for transmitting the transport block. When the transmission of the transport block is latency sensitive, the TTI for transmitting the transport block can be set to a shortened TTI that is less than a normal TTI for user data transmission in order to reduce the transmission latency. In addition, the segmentation threshold can also be set to a shortened threshold that is less than a normal segmentation threshold for user data transmission. The segmentation threshold can be set to a smaller number when the TTI becomes smaller. Compared with using the normal segmentation threshold, using the shortened segmentation threshold allows the transport block to be segmented into an increased number of code blocks with a smaller size, which may further reduce the transmission latency because of reduced coding/decoding complexity for the smaller code blocks and/or parallel coding/decoding processing for the increased number of code blocks.

Figure 1:
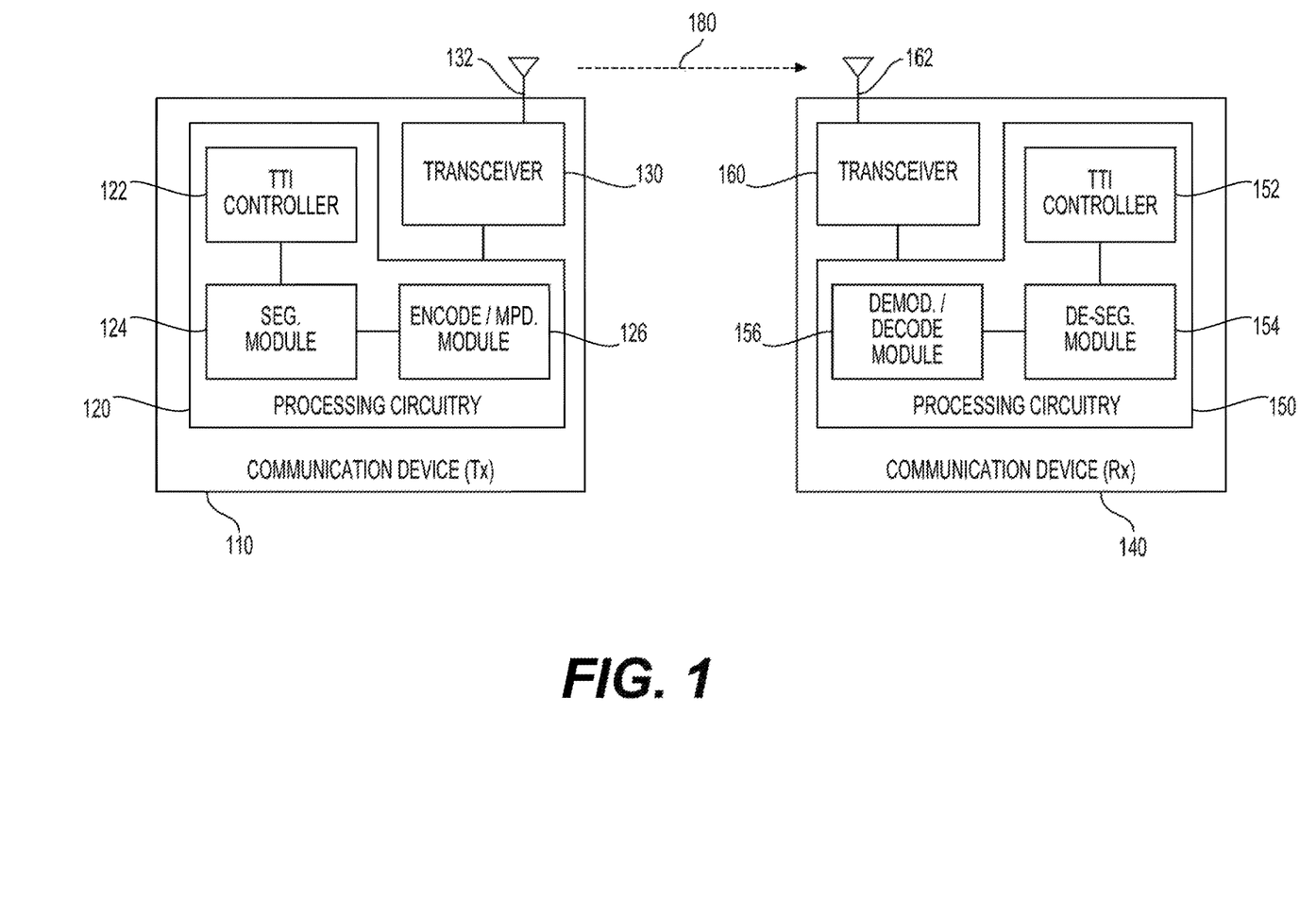
FIG. 1 shows an exemplary functional block diagram of a transmitting communication device and a receiving communication device for illustrating data transmission therebetween according to an embodiment of the disclosure.

FIG. 1 shows an exemplary functional block diagram of a transmitting communication device 110 and a receiving communication device 140 for illustrating data transmission therebetween according to an embodiment of the disclosure. The transmitting communication device 110 can process a transport block and transmit the processed transport block to the receiving communication device 140 using a communication channel 180 according to a predetermined communication standard. The receiving communication device 140 can receive the transmitted signals from the transmitting communication device 110 and reconstruct the transport block by processing the received signals according to the same predetermined communication standard.

The transmitting communication device 110 includes processing circuitry 120 and a transceiver 130. The processing circuitry 120 can process a transport block into modulation symbols. The transceiver 130 includes an antenna 132 and can convert the modulation symbols from the processing circuitry 120 into suitable radio frequency signals and transmit, via the antenna 132, the radio frequency signals using the communication channel 180.

The processing circuitry 120 may include a TTI controller 122, a segmentation module 124, and an encoding/modulating module 126. The TTI controller 122 can determine a TTI for transmitting a transport block. The segmentation module 124 can set a segmentation threshold for the transport block based on the determined TTI for transmitting the transport block, and convert the transport block into one or more raw code blocks based on the determined segmentation threshold. The encoding/modulating module 126 can process the raw code blocks from the segmentation module 124 into one or more outgoing code blocks that each has a size not greater than the determined segmentation threshold. The encoding/modulating module 126 can further encode the one or more outgoing code blocks and modulate the encoded outgoing code blocks into modulation symbols. In some examples, the segmentation module 124 can set the segmentation threshold to a first threshold or a second threshold that is less than the first threshold based on the determined TTI for the transport block. The first threshold may correspond to a normal TTI for user data transmission as set forth in the predetermined communication standard, and the first threshold may correspond to a shortened TTI that is less than normal TTI.

The receiving communication device 140 includes processing circuitry 150 and a transceiver 160. The transceiver 160 includes an antenna 162 and can receive via the antenna 162 radio frequency signals from the transmitting communication device 110. The transceiver 160 can convert the received radio frequency signals into modulation symbols, and the processing circuitry 150 can demodulate and decode the modulation symbols in order to reconstruct the transport block.

the processing circuitry 150 may include a TTI controller 152, a de-segmentation module 154, and a decoding/demodulating module 156. The TTI controller 152 can determine a TTI for receiving the transmission of the transport block. The de-segmentation module 154 can set a segmentation threshold for the transport block based on the determined TTI. The decoding/demodulating module 156 can demodulate the modulation symbols from the transceiver 160 into one or more encoded code blocks and decode the encoded code blocks into one or more incoming code blocks that each has a size not greater than the determined segmentation threshold. The decoding/demodulating module 156 can further process one or more incoming code blocks to become one or more raw code blocks.

The de-segmentation module 154 can further receive the one or more raw code blocks from the coding/demodulating module 156, and reconstruct the transport block from the one or more raw code blocks. In some examples, the de-segmentation module 154 can set the segmentation threshold to the first threshold or the second threshold as illustrated with reference to the transmitting communication device 110.

Examples regarding the TTIs and the segmentation of a transport block are further illustrated with reference to FIGS. 2 and 3.

Figure 2:
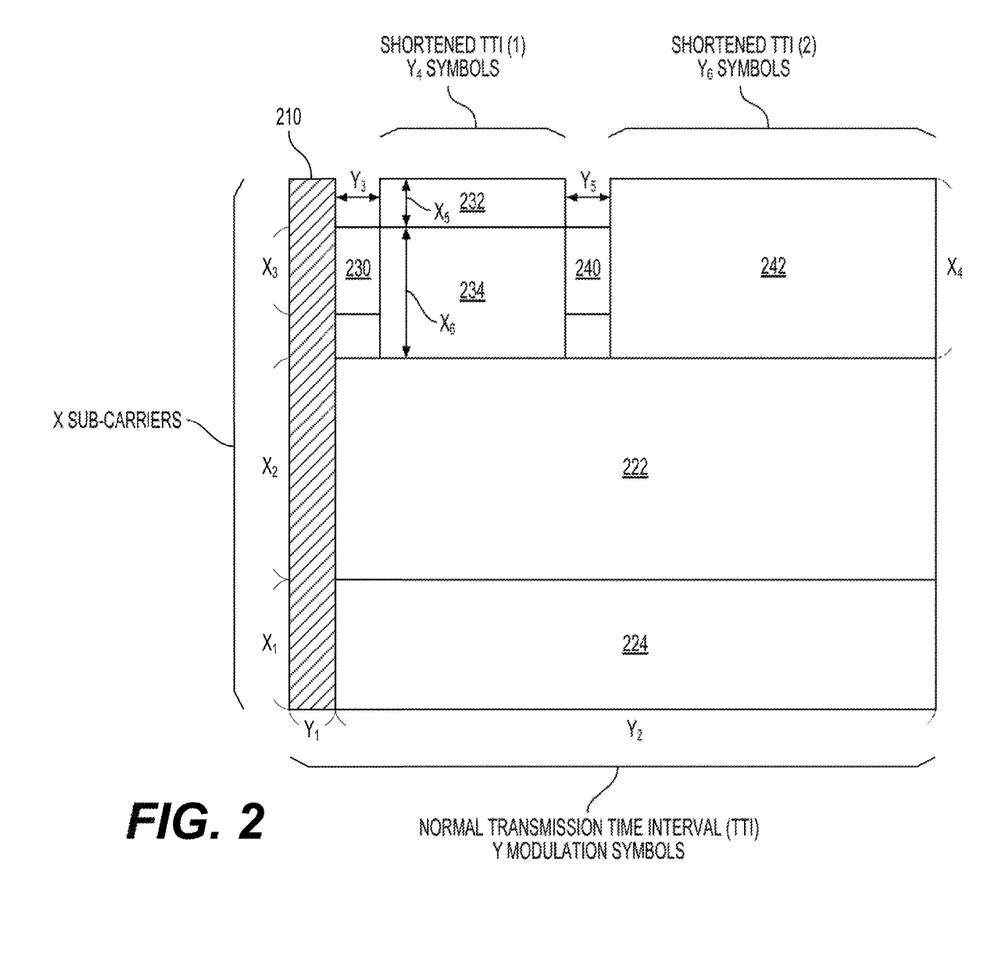
FIG. 2 shows an exemplary diagram for illustrating physical resource allocation according to an embodiment of the disclosure.

FIG. 2 shows an exemplary diagram for illustrating physical resource allocation according to an embodiment of the disclosure. In a communication system according to a predetermined communication standard, available physical resources may include X sub-carriers and can be allocated in units of a normal TTI when transmitting user data, as set forth in the predetermined communication standard. In some examples, the normal TTI may correspond to Y modulation symbols. In some examples according to a LTE standard, the normal TTI corresponds to 1 ms or 14 OFDM symbols.

In FIG. 2, block 210 represents the physical resources defined by X sub-carriers and $Y_1$ modulation symbols and can be used for transmitting control information applicable to all X sub-carriers during the normal TTI defined by the Y modulation symbols. Block 222 represents the physical resources defined by $X_2$ sub-carriers and $Y_2$ modulation symbols and can be used for transmitting user data for a first user equipment (UE1). Block 224 represents the physical resources defined by $X_1$ sub-carriers and $Y_2$ modulation symbols and can be used for transmitting user data for a second user equipment (UE2).

Moreover, block 230 represents the physical resources defined by $X_3$ sub-carriers and $Y_3$ modulation symbols and can be used for transmitting control information applicable to $X_4$ sub-carriers during a first shortened TTI defined by $Y_4$ modulation symbols. Block 232 represents the physical resources defined by $X_5$ sub-carriers and $Y_4$ modulation symbols and can be used for transmitting latency-sensitive data for a third user equipment (UE3). Block 234 represents the physical resources defined by $X_6$ sub-carriers and $Y_4$ modulation symbols and can be used for transmitting latency-sensitive data for a fourth user equipment (UE4). Also, block 240 represents the physical resources defined by $X_3$ sub-carriers and $Y_5$ modulation symbols and can be used for transmitting control information applicable to $X_4$ sub carriers during a second shortened TTI defined by $Y_6$ modulation symbols. Block 242 represents the physical resources defined by $X_4$ sub-carriers and $Y_6$ modulation symbols and can be used for transmitting latency-sensitive data for a fifth user equipment (UE5).

In some examples, the latency-sensitive data correspond to one or more predetermined control information or signaling information where a shorter processing latency would be expected, in some examples, the latency-sensitive data may include shortened version of Physical Downlink Shared Channel (sPDSCH) message, Physical Downlink Control Channel (sPDCCH) message, Physical Uplink Shared Channel (sPUSCH) message, and/or Physical Uplink Control Channel (sPUCCH) message. In some examples, the shortened TTI can be 2, 4, or 7 modulation symbols.

FIG. 2 only shows a non-limiting example of possible physical resource allocation that includes various different TTIs. Of course, a communication may allocate physical resources based, on different sub-carrier/TTI allocations.

Figure 3:
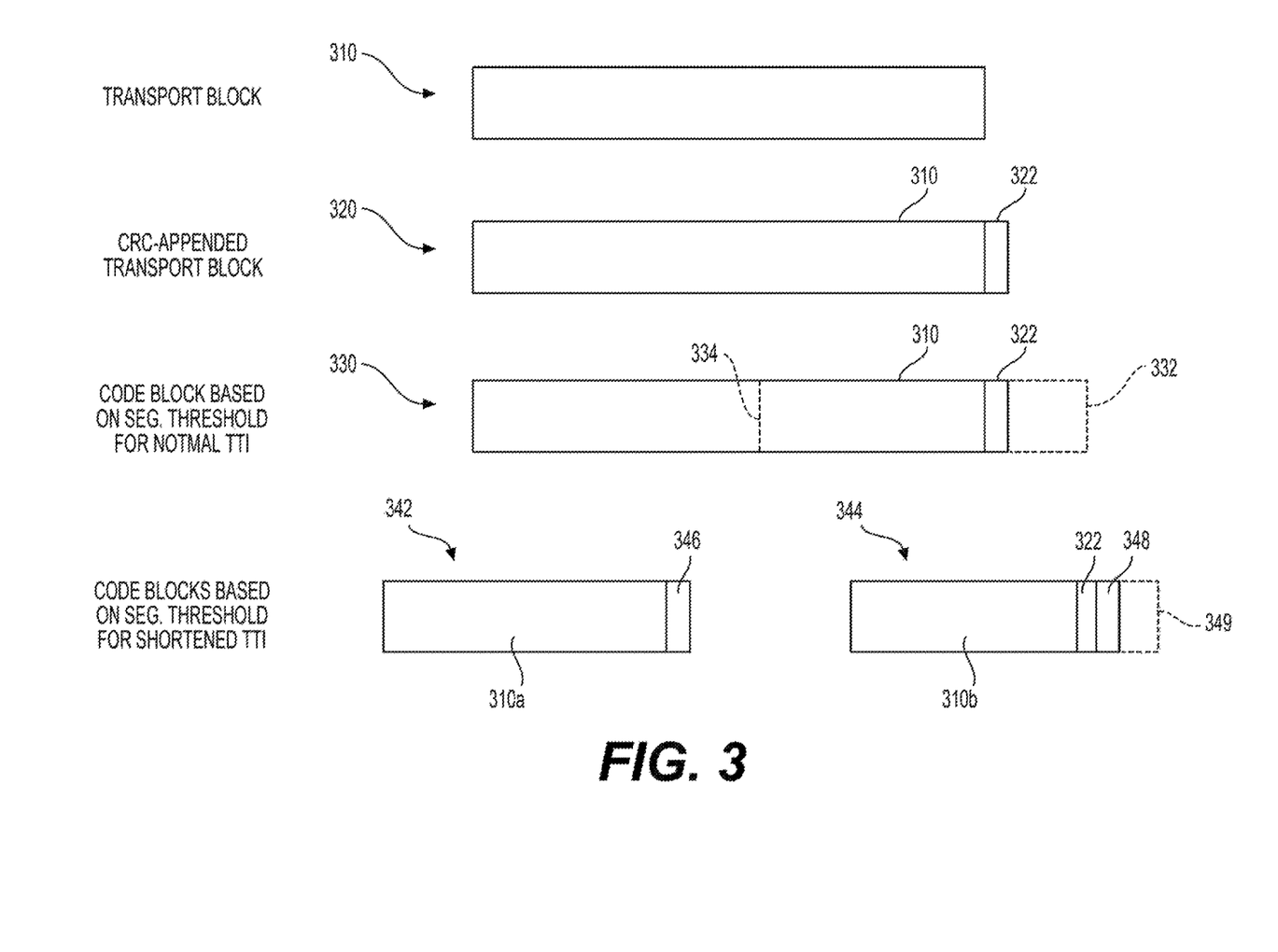
FIG. 3 shows an exemplary diagram for illustrating segmenting a transport block according to an embodiment of the disclosure.

FIG. 3 shows an exemplary diagram for illustrating segmenting a transport block 310 according to an embodiment of the disclosure. Before determining whether to divide the transport block 310 into several code blocks, a predetermined number of CRC bits 322 may be generated based on the entire transport block 310 and may be combined with the transport block 310 to form a CRC-appended transport block 320. In this, example, a total size, of the CRC-appended transport block 320 is less than a predetermined threshold 332 that corresponds to a normal TTI. If the segmentation threshold for the transport block 310 is set to the threshold 322, the CRC-appended transport block 320 may be used as a single code block 330.

In some example, the segmentation threshold for the transport block 310 may be set to a shortened threshold, as indicated by line 334, that corresponds to a shortened TTI and is less than the threshold 332. The CRC-appended transport block 320 may be converted into multiple code blocks, such, as code blocks 342 and 344. The code block 342 has a size not greater than the shortened threshold and includes a raw block that corresponds to a portion 310a of the transport block 310. The code block 342 also includes a predetermined number of CRC bits 346 venerated based on the portion 310a of the transport block 310. The code block 344 also has a size not greater than the shortened threshold as indicated by line 349 and includes a raw block that corresponds to another portion 310b of the transport block 310 and the CRC bits 322. The code block 344 also includes a predetermined number of CRC bits 348 generated based on the portion 310b of the transport block 310 and the CRC bits 322.

With reference to the transmitting communication device 110 and the receiving communication device 140, the segmentation module 124 or the de-segmentation module 154 may determine the segmentation threshold for the transport block in a similar manner.

In one example, the segmentation module 124 or the de-segmentation module 154 may set the segmentation threshold to a first threshold when the determined TTI is equal to or greater than a first TTI, such as the normal TTI set forth in the predetermined communication standard. The segmentation module 124 or the de-segmentation module 154 may set the segmentation threshold to a second threshold when the determined TTI is a second TTI that is less than the TTI. The segmentation threshold can be set based on a predetermined relation between the first TTI and the second TTI. In some examples, the segmentation threshold can be set based on a look-up table recording the predetermined relation. In some examples, the segmentation threshold can be set based on an equation representing the predetermined relation.

For example, the segmentation threshold can be set based on an equation of:

$$sSegTh = \text{rounding to integer of } [_{nTTI}{}^{sTTI} \cdot nSegTh],$$

where nSegTh corresponds to the first threshold for the first TTI, sSegTh corresponds to the second threshold for the transport block, nTTI corresponds to the first TTI, and sTTI corresponds to the second TTI. The rounding to integer function may be performed by a predetermined rounding rule, including rounding to the nearest, larger integer, rounding to the nearest, smaller integer, or the like.

In another example, the segmentation module 124 or the de-segmentation module 154 may set the segmentation threshold based on both the determined TTI and a normalized code block size. A normalized code block size corresponds to a ratio of a number of bits of the transport block to a maximum capacity of a number of hypothetical code blocks determined by segmenting the transport block based on the first threshold. For example, when a transport block can be hypothetically divided into two code blocks based on the first threshold, the normalized code block size is defined as a ratio of the number of bits of the a transport block to twice the first threshold. The predetermined ratio may correspond to an inverse of a predetermined number of channel decoder(s) for decoding the corresponding code blocks. For example, when a receiving communication device is likely to have two channel decoders, the predetermined ratio may be set to ½.

The segmentation module 124 or the de-segmentation module 154 may first determine the normalized code block size for the transport block. When the determined TTI is equal to or greater than a first TTI, such as the normal TTI set forth in the predetermined communication standard, the segmentation module 124 or the de-segmentation module 154 may set the segmentation threshold to the first threshold. When the determined TTI is less than the first TTI and the normalized code block size is equal to or less than a predetermined ratio, the segmentation module 124 or the de-segmentation module 154 may still set the segmentation threshold to the first threshold. Moreover, when the determined TTI is less than the first TTI and the normalized code block size is greater than the predetermined ratio, the segmentation module 124 or the de-segmentation module 154 may set the segmentation threshold to the second threshold.

In yet another example, the segmentation module 124 or the de-segmentation module 154 may set the segmentation threshold based on both the determined TTI and a cell radius of a cell in which the transmission of the transport block is performed. The segmentation module 124 or the de-segmentation module 154 may first determine the cell radius of the cell or the propagation delay between the base station and the UE. When the determined TTI is equal to or greater than a first TTI, the segmentation module 124 or the de-segmentation module 154 may set the segmentation threshold to the first threshold. When the determined TTI is less than the first TTI, the segmentation module 124 or the de-segmentation module 154 may set the segmentation threshold to the second threshold that can be determined based on the determined cell radius. In some examples, the second threshold may be further determined based on the determined cell radius. For example, the second threshold can be set to a first value when the determined cell radius corresponds to a second value, and the second threshold can be set to a third value greater than the first value when the determined cell radius corresponds to a fourth value less than the second value.

In yet another example, the segmentation module 124 or the de-segmentation module 154 may set the segmentation threshold based on both the determined TTI and a number of code block(s) corresponding to segmenting the transport block based on the first threshold. The segmentation module 124 or the de-segmentation module 154 may first determine the number of code block(s) corresponding to hypothetically segmenting the transport block based on the first threshold and may determine a remainder of dividing the determined number of code block(s) by a predetermined number of channel decoder(s) for decoding the one or more outgoing or incoming code blocks. When the determined the determined TTI is equal to or greater than a first TTI, the segmentation module 124 or the de-segmentation module 154 may set the segmentation threshold to the first threshold. When the determined the determined TTI is less than the first TTI and the determined remainder is zero, the segmentation module 124 or the de-segmentation module 154 may still set the segmentation threshold to the first threshold. When the determined TTI is less than the first TTI and the determined remainder is not zero, the segmentation module 124 or the de-segmentation module 154 may set the segmentation threshold to the second threshold.

Of course, the segmentation module 124 or the de-segmentation module 154 may set the segmentation threshold based on any one or a combination of the examples illustrated above. For example, when the predetermined number of channel decoder(s) is two and the number of hypothetical code block based on the first threshold for the normal TTI is one, the segmentation threshold may be set based on the corresponding normalized code block size. In addition, when the predetermined number of channel decoder(s) is two and the number of hypothetical code blocks based on the first threshold for the normal TTI is greater than two, the segmentation threshold may be set based on the corresponding remainder, e.g., when the number of hypothetical code blocks is an odd integer equal to or greater than three.

Figure 4:
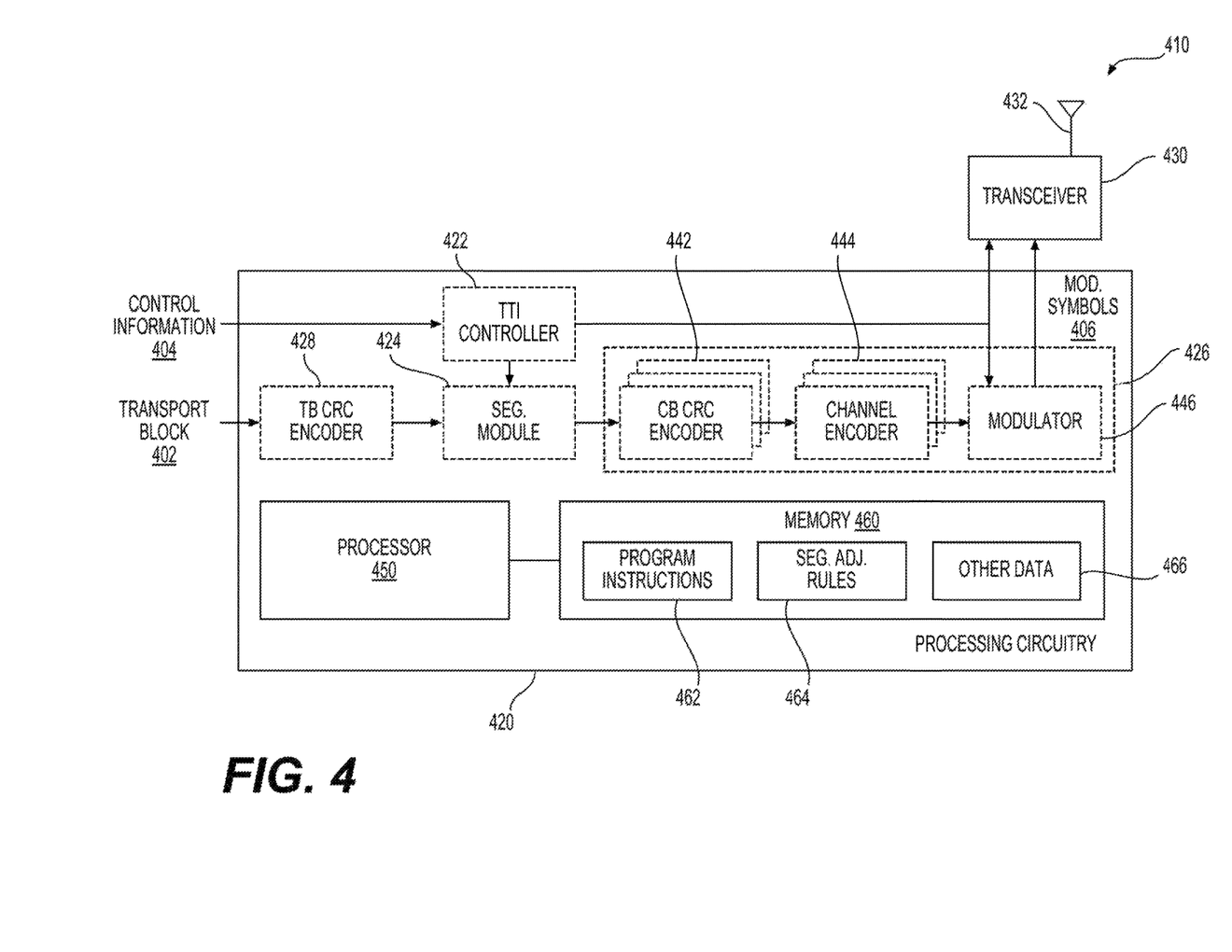
FIG. 4 shows an exemplary functional block diagram of a transmitting communication device according to an embodiment of the disclosure.

FIG. 4 shows an exemplary functional block diagram of a transmitting communication device 410 according to an embodiment of the disclosure. The transmitting communication device 410 may correspond to the transmitting communication device 110 in FIG. 1. The transmitting communication device 410 can include processing circuitry 420 and a transceiver 430. The processing circuitry 420 can receive a transport block 402 and control information 404 regarding the transmission of the transport block 402. The processing circuitry 420 can convert the transport block 402 into modulation symbols 406 based on the control information 404. The transceiver 430 includes an antenna 423 and can receive the modulation symbols 406 from the processing circuitry 420 and transmit the modulation symbols 406 via the antenna 423 in the form of radio frequency signals. The transmitting communication device 410 may transmit the transport block using the radio frequency signals according to one or more predetermined communication standards, such as a Universal Mobile Telecommunications System (UMTS) standard, a Long-Term Evolution (LTE) standard, a Worldwide Interoperability for Microwave Access (Wi-MAX) standard, any other suitable wireless communication standard, or the like.

The processing circuitry 420 may include a TTI controller 422, a segmentation module 424, an encoding/modulating module 426, a transport block CRC encoder 428, a processor 450, and a memory 460. The encoding/modulating, module 426 may include one or more code block CRC encoders 442, one or more channel encoders 444, and a modulator 446. The memory 460 may store information including program instructions 462, rules for adjusting a segmentation threshold 464, and/or other data or intermediate data 466.

The transport block CRC encoder 428 may receive the transport block 402 and convert the transport block 402 into a CRC-appended transport block. The transport block CRC encoder 428 may generate a predetermined number of CRC bits based on the transport block 402 and combine the transport block 402 and the generated CRC bits into the CRC-appended transport block in a manner as described with reference to FIG. 3. In some examples base (on a LTE standard, the predetermined number of CRC bits corresponds to 24 CRC bits.

The TTI controller 422 can determine a TTI for transmitting the transport block 402 based on the control information 404. In some examples, the determined TTI can be a normal TTI for transmission of user data as set forth in a predetermined communication standard or a shortened TTI that is less than the normal TTI. The TTI can be defined in units of milliseconds of a number of modulation symbols.

The segmentation module 424 can set a segmentation threshold for the transport block 402 based on the determined TTI for the transmission of the transport block 402 and convert the CRC-appended transport block from the transport block CRC encoder 428 into one or more raw code blocks based on the determined segmentation threshold. In some examples, the segmentation module 424 can set the segmentation threshold with reference to the rules for adjusting a segmentation threshold 464 stored in the memory 460. In some examples, the segmentation module 424 cap set the segmentation threshold in a manner as described with reference to FIGS. 1-3.

The one or more code block CRC encoders 442 can add respective CRC bits to the raw code blocks from the segmentation module 424 to form one or more outgoing code blocks when the CRC-appended transport block is segmented into plural raw code blocks. Each outgoing code block has a size not greater than the determined segmentation threshold. In some examples, when the CRC-appended transport block is used as a single outgoing code block without further segmentation, the one or more code block CRC encoders 442 may be bypassed. The one or more channel encoders 444 can perform channel encoding to the outgoing code blocks from the code block CRC encoders 442 when the CRC-appended transport block is segmented into plural code blocks. In some examples, when the CRC-appended transport block is used as the single outgoing code block without further segmentation, one of the one or more channel encoder 444 can perform channel encoding to the outgoing code block. In some examples when multiple channel encoders 444 are used,the channel encoders 444 may process the outgoing code blocks in a parallel manner.

The modulator 426 can receive the channel-encoded code blocks from the one or more channel encoders 444 and translate the channel-encoded code blocks into modulation symbols 406 according to the determined TTI from the TTI controller and/or the control information 404. The transceiver 430 then transmits the modulation symbols 406 in the form of radio frequency signals.

The processor 450 can be configured to execute the program instructions 462 stored in the memory 460 to perform various functions. The processor 450 can include a single or multiple processing cores. Various components or modules of the processing circuitry 420, such as the TTI controller 422, the segmentation module 424, the transport block encoder 428, the one or more code block CRC encoders, the one or more channel encoders 444, and/or the modulator 446 may be implemented by hardware components, the processor 450 executing the program instructions 462, or a combination thereof. Of course, the processor 450 can also execute program instructions 462 to perform other functions for the communication device 410 that are not described in the present disclosure.

The memory 460 can be used to store the program instructions 462, rules for adjusting a segmentation threshold 464, and/or other data or intermediate data 466. In some examples, the memory 460 includes a non-transitory computer readable medium, such as a semiconductor or solid-state memory, a random access memory (RAM), a read-only memory (ROM), a hard disk, an optical disk, or other suitable storage medium. In some, embodiments, the memory 460 includes a combination of two or more of the non-transitory computer readable mediums listed above.

In operation, the transport block CRC encoder 428 receives a transport block 402 that is to be transmitted and convert the transport block 402 into a CRC-appended transport block. The controller 422 receives control information 404 regarding the transmission of the transport block 402 and determines a TTI for transmitting the transport block 402 accordingly. The segmentation module 424 then determines a segmentation threshold based on the determined TTI with reference to the rules for adjusting a segmentation threshold 464 stored in the memory 460 in a manner as described with reference to FIGS. 1-3. The segmentation module and the code block CRC encoders 442 together convert the transport block into one or more outgoing code blocks. Each of the outgoing code blocks has a size not greater than the segmentation threshold determined by the segmentation module 424. Afterwards, the channel encoders 444 perform channel encoding on the one or more outgoing code blocks, and the modulator 446 translates the channel-encoded code blocks into modulation symbols. Finally, the transceiver 430 transmits the modulation symbols in the form of radio frequency signals.

Figure 5:
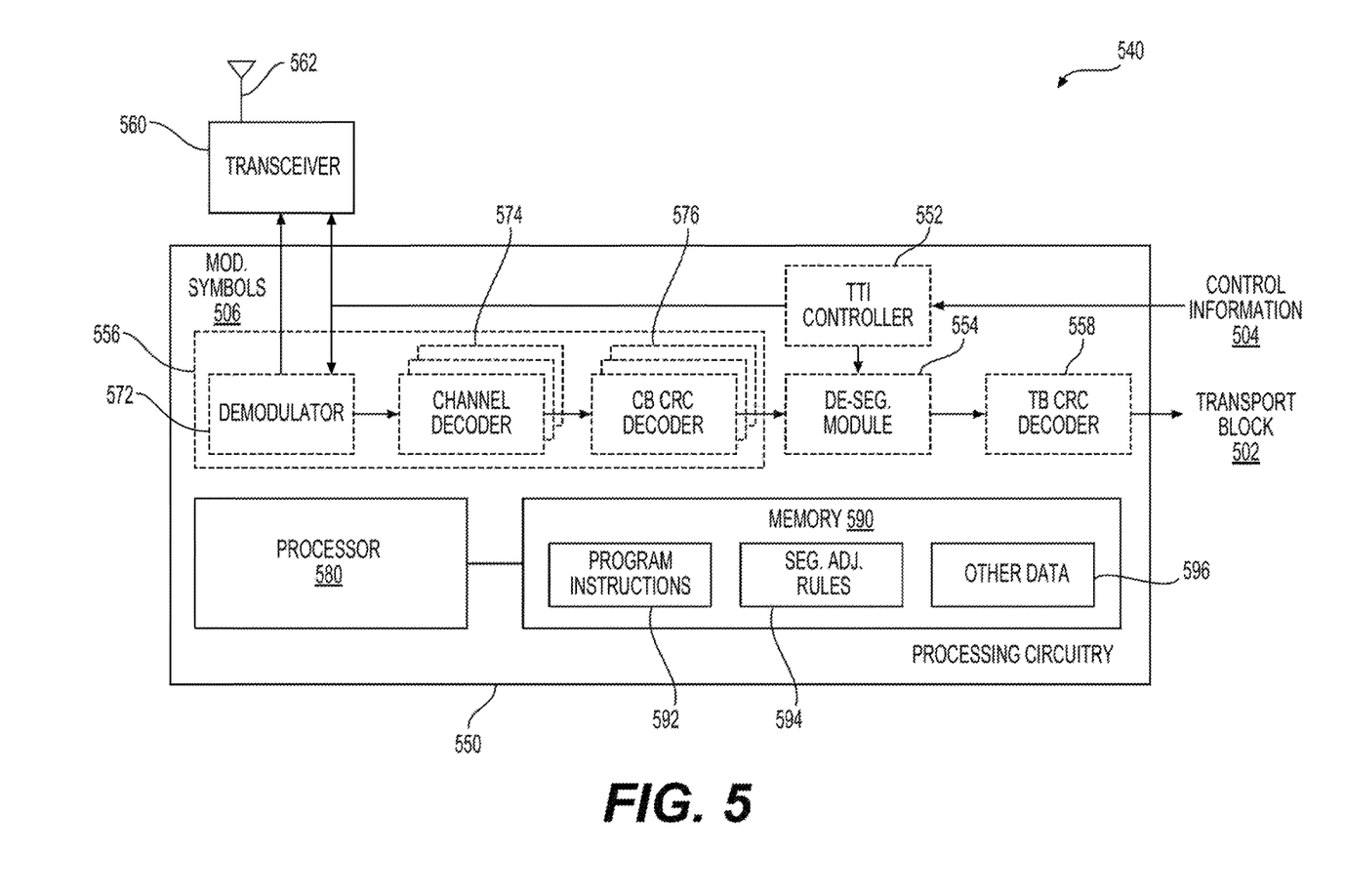
FIG. 5 shows an exemplary functional block diagram of a receiving communication device according to an embodiment of the disclosure.

FIG. 5 shows an exemplary functional block diagram of a receiving communication device 540 according to an embodiment of the disclosure. The receiving communication device 540 may correspond to the receiving communication device 140 in FIG. 1. The receiving communication device 540 can include processing circuitry 550 and a transceiver 560. The transceiver 560 includes an antenna 562 and can receive radio frequency signals via the antenna 562 and convert the received radio frequency signals into modulation symbols 506. The processing circuitry 550 can process the modulation symbols 506 to reconstruct a transport block 502 for further data processing. The receiving communication device 540 may receive the transport block 502 using the radio frequency signals according to one or more predetermined communication standards, such as a UMTS standard, a LTE standard, a WiMAX standard, any other suitable wireless communication standard, or the like.

The processing circuitry 550 may include a TTI controller 552, a de-segmentation module 554, a decoding/demodulating module 556, a transport block CRC decoder 558, a processor 580, and a memory 590. The decoding/demodulating module 556 may include a demodulator 572, one or more channel decoders 574, and one or more code block CRC decoders 576. The memory 590 may store information including program instructions 592, rules for adjusting a segmentation threshold 594, and/or other data or intermediate data 596.

The TTI controller 552 can determine a TTI for receiving the transmission of the transport block 502 based on the control information 504 corresponding to receiving the transmission of the transport block 502. In some examples, the determined TTI can be a normal TTI for transmission of user data as set forth in a predetermined communication standard or a shortened TTI that is less than the normal TTI. The TTI can be defined in units of milliseconds of a number of modulation symbols.

The demodulator 572 can receive the modulation symbols 506 from the transceiver 560 and translate the modulation symbols 506 into channel-encoded code blocks according to the determined TTI from the TTI controller 552 and/or the control information 504. The demodulator 572 can forward the channel-encoded code blocks to the one or more channel decoders 574. The one or more channel decoders 574 can perform channel decoding to the channel-encoded code blocks to output one or more incoming code blocks that each has a size not greater than the determined segmentation threshold. The one or more code block CRC decoders 576 can perform CRC decoding to the one or more incoming code blocks to output one or more raw code blocks. In some examples, when only one incoming code block is used to transmit the transport block, the incoming transport block from the channel decoders 574 is used as the raw code block without code block CRC decoding.

The de-segmentation module 554 can set a segmentation threshold for the transport block 502 based on the determined TTI for receiving the transmission of the transport block 502 and reconstruct a CRC-appended transport block from the one or more raw code blocks from the code block CRC decoder 576. In some examples, the de-segmentation module 554 can set the segmentation threshold with reference to the rules for adjusting a segmentation threshold 594 stored in the memory 590. In some examples, the de-segmentation module 554 can set the segmentation threshold in a manner as described with reference to FIGS. 1-3. In some examples, when only one incoming code block is used to transmit the transport block, the incoming transport block from the channel decoders 574 is used as the raw code block, as well as the CRC-appended transport block. The transport block CRC decoder 558 may convert the CRC-appended transport block from the de-segmentation module 554 into the transport block 502 and output the transport block 502 for further data processing.

The processor 580 can be configured to execute the program instructions 592 stored in the memory 590 to perform various functions. The processor 580 can include a single or multiple processing cores. Various components or modules of the processing circuitry 550, such as the TTI controller 552, the de-segmentation module 554, the transport block decoder 558, the demodulator 572, the one or more channel encoders 574, and/or the one or more code block CRC decoders 576 may be implemented by hardware components, the processor 580 executing the program instructions 592, or a combination thereof. Of course, the processor 580 can also execute program instructions 592 to perform other functions for the communication device 410 that are not described in the present disclosure.

The memory 590 can be used to store the program instructions 592, rules for adjusting a segmentation threshold 594, and/or other data or intermediate data 596. In some examples, the memory 590 includes a non-transitory computer readable medium, such as a semiconductor or solid-state memory, a random access memory (RAM), a read-only memory (ROM), a hard disk, an optical disk, or other suitable storage medium. In some embodiments, the memory 590 includes a combination of two or more of the non-transitory computer readable mediums listed above.

In operation, the TTI controller 552 determines a TTI for receiving the transmission of the transport block 502 based on the control information 504. The transceiver 560 receives radio frequency signals and converts the received radio frequency signals into modulation symbols 506 based on the determined TTI. The demodulator 572 translates the modulation symbols 506 into channel-encoded code blocks based on the determined TTI and/or the control information 504. The one or more channel decoders 574 then convert the channel-encoded code blocks into incoming code blocks. In some examples when multiple channel decoders 574 are used, the channel decoders 574 may process the channel-encoded code blocks in a parallel manner.

Meanwhile, the segmentation module 554 determines a segmentation threshold based on the determined TTI with reference to the rules for adjusting a segmentation threshold 594 stored in the memory 590 in a manner as described with reference to FIGS. 1-3. The one or more code block CRC decoders 576 and the segmentation module 554 together reconstruct a CRC-appended transport block from the incoming code blocks. Finally, the transport block CRC decoder 558 converts the CRC-appended transport block into the transport block 502.

Figure 6:
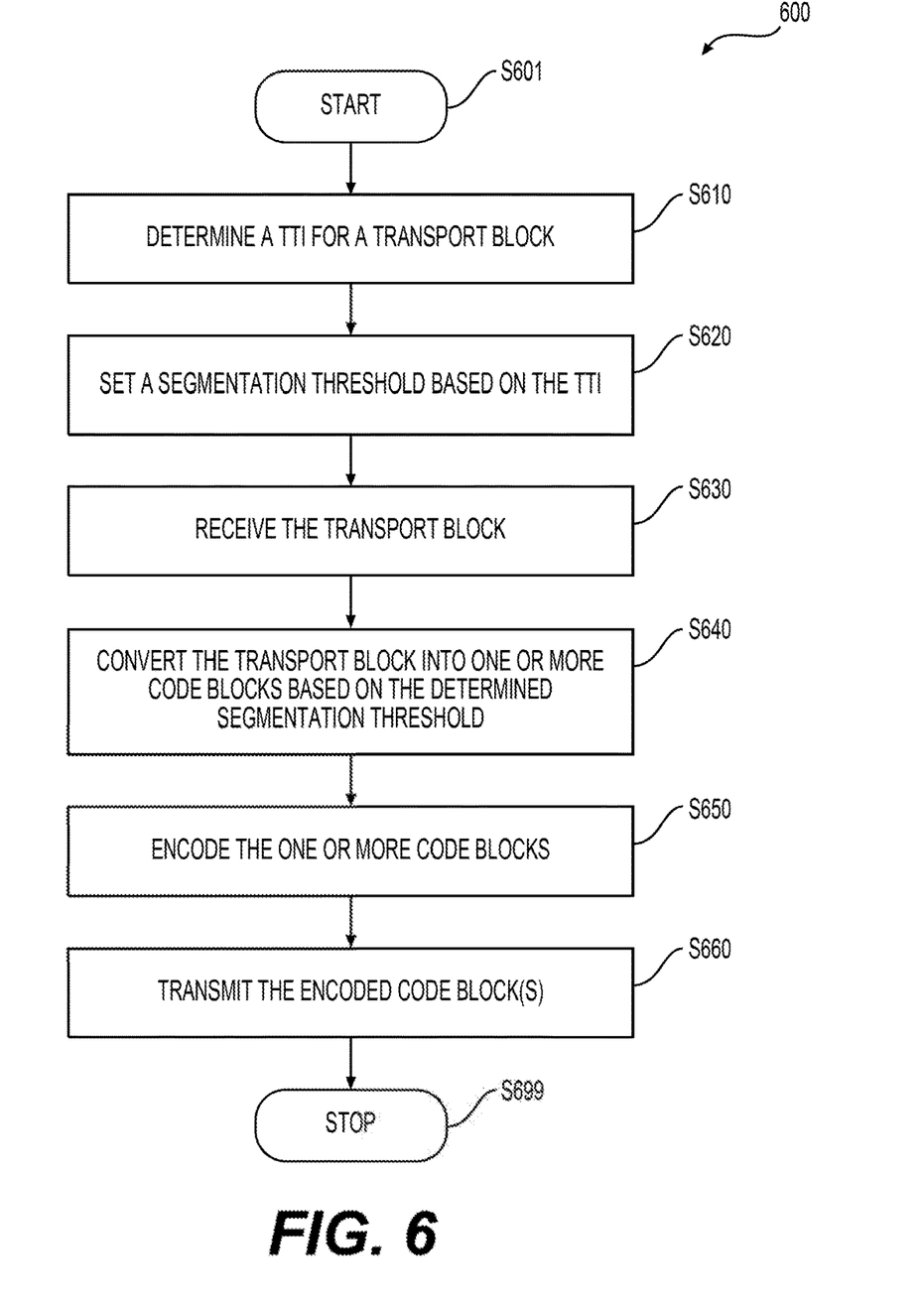
FIG. 6 shows a flow chart outlining an exemplary process for transmitting a transport block according to an embodiment of the disclosure.

FIG. 6 shows a flow chart outlining an exemplary process 600 for transmitting a transport block according to an embodiment of the disclosure. The process 600 may be performed by a transmitting communication device, such as the transmitting communication device 110 in FIG. 1 or the transmitting communication device 410 in FIG. 4. It is understood that additional operations may be performed before, during, and/or after the process 600 depicted in FIG. 6. The process 600 starts at S601 and proceeds to S610.

At S610, a TTI for transmitting a transport block is determined. In some examples, a normal TTI is used when the transport block carries user data, and a shortened TTI less than the normal TTI is set when the transport block carries latency-sensitive data. In some examples, the latency-sensitive data correspond to one or more predetermined control information or signaling information where a shorter processing latency would be expected. In some examples, the latency-sensitive data may include a sPDSCH message, sPDCCH message, sPUSCH message, and/or sPUCCH message. In some examples, the shortened TTI can be 2, 4, or 7 modulation symbols. For example, the TTI controller 122 or 422 may determine the TTI for transmitting a transport block as described with reference to FIGS. 1, 2, and 4.

At S620, a segmentation threshold for the transport block is set to a first threshold or a second threshold that is less than the first threshold based on the determined TTI for the transmission of the transport block. For example, the segmentation module 124 or 424 can set the segmentation threshold for the transport block in a manner as described with reference to FIGS. 1-4.

At S630, the transport block to be transmitted based on the determined segmentation threshold is received. For example, the processing circuitry 120 or 420 can receive the transport block as described with reference to FIGS. 1 and 4.

At S640, the transport block is convened into one or more outgoing code blocks based on the determined segmentation threshold. Each of the one or more outgoing code blocks has a size not greater than the determined segmentation threshold. For example, the segmentation module 124 and the encoding/modulating module 126 in FIG. 1, or the segmentation module 424 and the one or more code block CRC encoders 442 in FIG. 4, can convert the transport block into outgoing code blocks as described with reference to FIGS. 1-4.

At S650, the one or more code outgoing blocks are further encoded for transmission. For example, the one or more channel encoders 444 can perform channel coding on the one or more outgoing code blocks as described with reference to FIG. 4.

At S660, the encoded code blocks are transmitted. In some examples, the encoded code blocks are first translated into modulation symbols, and then modulation symbols are transmitted in the form of radio, frequency signals. For example, the modulator 446 can translate the channel-coded code blocks into modulation symbols, and the transceiver 460 can transmit the modulation symbols in the form of radio frequency signals as described with reference to FIG. 4.

After S660, the process proceeds to S699 and terminates.

Figure 7:
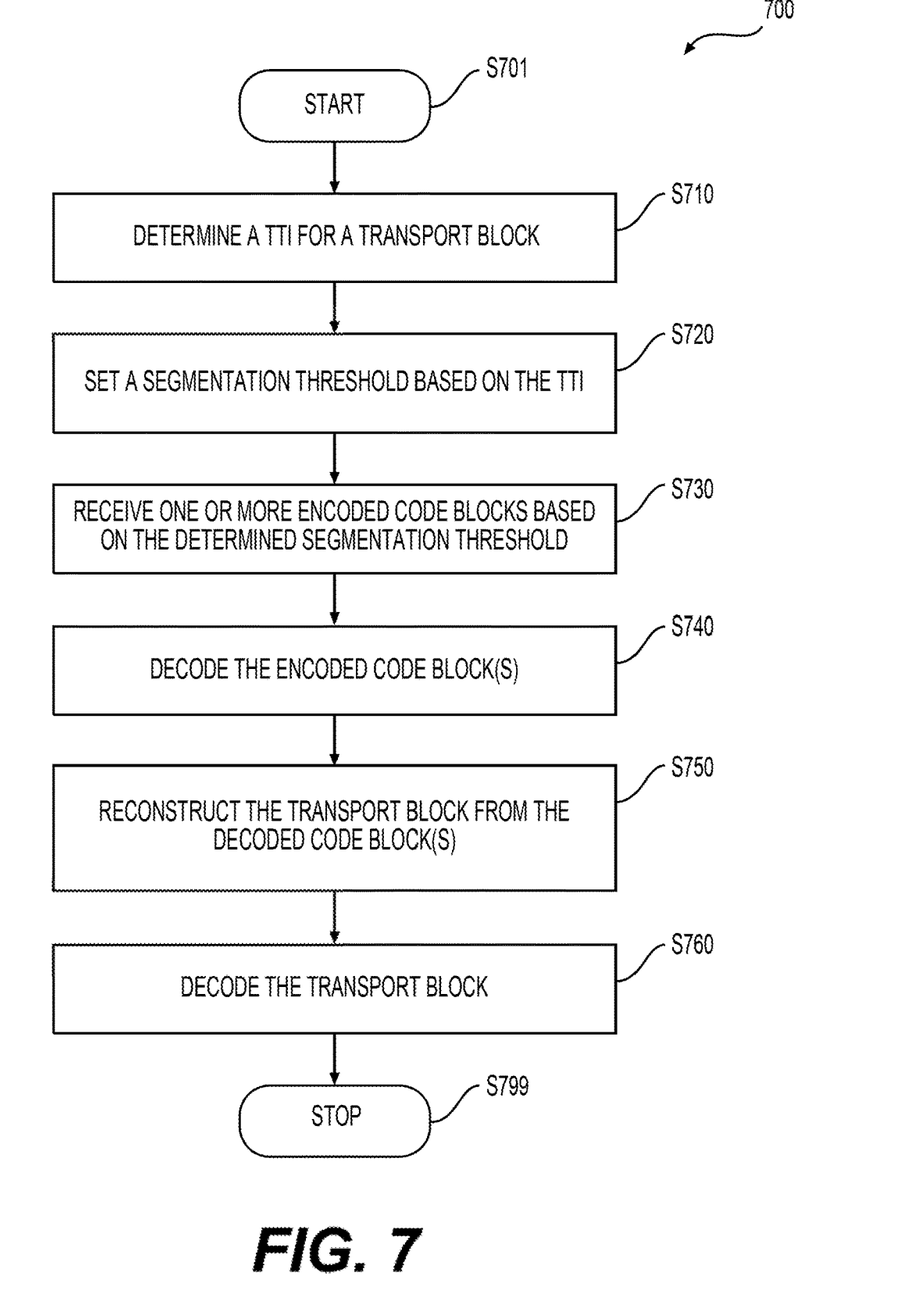
FIG. 7 shows a flow chart outlining an exemplary process for receiving a transport, block according to an embodiment of the disclosure.

FIG. 7 shows a flow chart outlining an exemplary process 700 for receiving a transport block according to an embodiment of the disclosure. The process 700 may be performed by a transmitting communication device, such as the transmitting communication device 140 in FIG. 1 or the transmitting communication device 540 in FIG. 5. It is understood that additional operations may be performed before, during, and/or after the process 700 depicted in FIG. 7. The process 700 starts at S701 and proceeds to S710.

At S710, a TTI for receiving the transmission of a transport block is determined. In some examples, a normal TTI is used when the transport block carries user data, and a shortened TTI less than the normal TTI is set when the transport block carries latency-sensitive data. In some examples, the latency-sensitive data correspond to one or more predetermined control information or signaling information where a shorter processing latency would be expected. In some examples, the latency-sensitive data may include a sPDSCH message, sPDCCH message, sPUSCH message, and/or sPUCCH message. In some examples, the shortened TTI can be 2, 4, or 7 modulation symbols. For example, the TTI controller 152 or 552 may determine the TTI for transmitting a transport block as described with reference to FIGS. 1, 2, and 5.

At S720, a segmentation threshold for the transport block is set to a first threshold or a second threshold that is less than the first threshold based on the determined TTI for the transmission of the transport block. For example, the de-segmentation module 154 or 554 can set the segmentation threshold for the transport block in a manner as described with reference to FIGS. 1-3 and 5.

At S730, one or more encoded code blocks are received based on the determined segmentation threshold. In some examples, radio frequency signals corresponding to the transmission of the transport block, are received, and the received frequency signals are converted into modulation symbols and then the encoded code blocks. For example, the transceiver 560 and the demodulator 572 can receive the radio frequencies and output channel-encoded code blocks based on the determined segmentation threshold, and the one or more channel decoders 574 can receive the channel-encoded code blocks as described with reference to FIG. 5.

At S740, the encoded code blocks are decoded to become one or more incoming code blocks. Each of the one or more incoming code blocks has a size not greater than the determined segmentation threshold. For example, the one or more channel decoders 574 can convert the channel-encoded code blocks into incoming code blocks as described with reference to FIG. 5.

At S750, the transport block is reconstructed from the one or more code incoming blocks. For example, the de-segmentation module 154 or 554 can reconstruct the CRC-appended transport block from the one or more code incoming blocks as described with reference to FIGS. 1 and 5. Moreover, the transport block CRC decoder 558 can convert the CRC-appended transport block into the transport block 502 and output the transport block as described with reference to FIG. 5.

At S760, the transport block is output for further processing. For example, the processing circuitry 150 or 550 can output the decoded, transport block as described with reference to FIGS. 1 and 5.

After S760, the process proceeds to S799 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of data transmission, comprising:
    determining a transmission time interval for transmission of a transport block;
    setting, by processing circuitry of a communication device, a segmentation threshold for the transport block to a first threshold when the determined transmission time interval is equal to or greater than a first transmission time interval;
    setting, by the processing circuitry of the communication device, the segmentation threshold to one of the first threshold and a second threshold that is less than the first threshold when the determined transmission time interval is less than the first transmission time interval, the first threshold and the second threshold being applicable for segmenting the transport block for transmission using the determined transmission time interval;
    converting the transport block into one or more outgoing code blocks that each has a size not greater than the determined segmentation threshold and encoding the one or more outgoing code blocks for transmission when the communication device is configured to transmit the transport block; and
    receiving one or more incoming code blocks that each has a size not greater than the determined segmentation threshold and reconstructing the transport block from the one or more incoming code blocks when the communication device is configured to receive the transport block.

2. The method according to claim 1, wherein the setting the segmentation threshold comprises:
    setting the segmentation threshold to the second threshold when the determined transmission time interval is less than the first transmission time interval.

3. The method according to claim 1, further comprising, when the determined transmission time interval is less than the first transmission time interval, setting the second threshold based on an equation of:

$$sSegTh = \text{rounding to integer of } [sTTI/nTTI \cdot nSegTh],$$

where
nSegTh corresponds to the first threshold,
sSegTh corresponds to the second threshold,
nTTI corresponds to the first transmission time interval, and
sTTI corresponds to the determined transmission time interval.

4. The method according to claim 1, wherein the first transmission time interval is defined in a unit of modulation symbols, in a unit of OFDM symbols, or in a unit of milliseconds.

5. The method according to claim 1, wherein the setting the segmentation threshold comprises:
    determining a normalized code block size corresponding to a ratio of a number of bits of the transport block to a maximum capacity of one or more hypothetical code blocks determined by segmenting the transport block based on the first threshold;
    setting the segmentation threshold to the first threshold when the determined transmission time interval is less than the first transmission time interval and the normalized code block size is equal to or less than a predetermined ratio; and
    setting the segmentation threshold to the second threshold when the determined transmission time interval is less than the first transmission time interval and the normalized code block size is greater than the predetermined ratio.

6. The method according to claim 5, wherein the predetermined ratio corresponds to an inverse of a predetermined number of channel decoder(s) for decoding the one or more outgoing or incoming code blocks.

7. The method according to claim 1, wherein the setting the segmentation threshold comprises:
    determining a cell radius of a cell in which the transmission of the transport block is performed; and
    setting the segmentation threshold to the second threshold when the determined transmission time interval is less than the first transmission time interval, including determining the second threshold based on the determined cell radius.

8. The method according to claim 7, wherein the determining the second threshold based on the determined cell radius comprises:
    setting the second threshold to a first value when the determined cell radius corresponds to a second value; and
    setting the second threshold to a third value greater than the first value when the determined cell radius corresponds to a fourth value less than the second value.

9. The method according to claim 1, wherein the setting of the segmentation threshold comprises:
    determining a number of code block(s) corresponding to segmenting the transport block based on the first threshold;
    determining a remainder of dividing the determined number of code block(s) by a predetermined number of channel decoder(s) for decoding the one or more outgoing or incoming code blocks;
    setting the segmentation threshold to the first threshold when the determined transmission time interval is less than the first transmission time interval and the determined remainder is zero; and setting the segmentation threshold to the second threshold when the determined transmission time interval is less than the first transmission time interval and the determined remainder is not zero.

10. The method according to claim 1, wherein the setting the segmentation threshold comprises:
    determining a number of code block(s) corresponding to segmenting the transport block based on the first threshold;
    determining a remainder of dividing the determined number of code block(s) by two;
    setting the segmentation threshold to the first threshold when the determined transmission time interval is less than the first transmission time interval and the determined remainder is zero; and
    setting the segmentation threshold to the second threshold when the determined transmission time interval is less than the first transmission time interval and the determined remainder is one.

11. A communication device for data transmission, comprising:
    a transceiver; and
    processing circuitry coupled with the transceiver and configured to:
        determine a transmission time interval for transmission of a transport block;
        set a segmentation threshold for the transport block to a first threshold when the determined transmission time interval is equal to or greater than a first transmission time interval;
        set the segmentation threshold to one of the first threshold and a second threshold that is less than the first threshold when the determined transmission time interval is less than the first transmission time interval, the first threshold and the second threshold being applicable for segmenting the transport block for transmission using the determined transmission time interval;
        convert the transport block into one or more outgoing code blocks that each has a size not greater than the determined segmentation threshold and encode the one or more outgoing code blocks for transmission through the transceiver when the communication device is configured to transmit the transport block; and
        receive through the transceiver one or more incoming code blocks that each has a size not greater than the determined segmentation threshold and reconstruct the transport block from the one or more incoming code blocks when the communication device is configured to receive the transport block.

12. The communication device according to claim 11, wherein the processing circuitry is configured to:
    set the segmentation threshold to the second threshold when the determined transmission time interval is less than the first transmission time interval.

13. The communication device according to claim 11, the processing circuitry is configured to, when the determined transmission time interval is less than the first transmission time interval, set the second threshold based on an equation of:

$$sSegTh = \text{rounding to integer of } [sTTI/nTTI \cdot nSegTh],$$

where
nSegTh corresponds to the first threshold,
sSegTh corresponds to the second threshold,
nTTI corresponds to the first transmission time interval, and
sTTI corresponds to the determined transmission time interval.

14. The communication device according to claim 11, wherein the processing circuitry is configured to:
    determine a normalized code block size corresponding to a ratio of a number of bits of the transport block to a maximum capacity of one or more hypothetical code blocks determined by segmenting the transport block based on the first threshold;
    set the segmentation threshold to the first threshold when the determined transmission time interval is less than the first transmission time interval and the normalized code block size is equal to or less than a predetermined ratio; and
    set the segmentation threshold to the second threshold when the determined transmission time interval is less than the first transmission time interval and the normalized code block size is greater than the predetermined ratio.

15. The communication device according to claim 14, wherein the predetermined ratio corresponds to an inverse of a predetermined number of channel decoder(s) for decoding the one or more outgoing or incoming code blocks.

16. The communication device according to claim 11, wherein the processing circuitry is configured to:
    determine a cell radius of a cell in which the transmission of the transport block is performed;
    set the segmentation threshold to the second threshold when the determined transmission time interval is less than the first transmission time interval, the second threshold being set to
        a first value when the determined cell radius corresponds to a second value, and
        a third value greater than the first value when the determined cell radius corresponds to a fourth value less than the second value.

17. The communication device according to claim 11, wherein the processing circuitry is configured to:
    determine a number of code block(s) corresponding to segmenting the transport block based on the first threshold;
    determine a remainder of dividing the determined number of code block(s) by a predetermined number of channel decoder(s) for decoding the one or more outgoing or incoming code blocks;
    set the segmentation threshold to the first threshold when the determined transmission time interval is less than the first transmission time interval and the determined remainder is zero; and
    set the segmentation threshold to the second threshold when the determined transmission time interval is less than the first transmission time interval and the determined remainder is not zero.

* * * * *